United States Patent
Koseki et al.

(10) Patent No.: US 10,345,949 B2
(45) Date of Patent: Jul. 9, 2019

(54) AUDIO DEVICE AND MENU DISPLAY METHOD OF AUDIO DEVICE

(71) Applicant: FUJITSU TEN LIMITED, Kobe-shi, Hyogo (JP)

(72) Inventors: Tomohisa Koseki, Kobe (JP); Masashi Otomi, Kobe (JP); Masaki Watase, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 8 days.

(21) Appl. No.: 15/220,245

(22) Filed: Jul. 26, 2016

(65) Prior Publication Data

US 2017/0060323 A1 Mar. 2, 2017

(30) Foreign Application Priority Data

Aug. 27, 2015 (JP) ................................. 2015-168209

(51) Int. Cl.
- *G06F 3/01* (2006.01)
- *G06F 3/041* (2006.01)
- *G06F 3/0488* (2013.01)

(52) U.S. Cl.
CPC ............ *G06F 3/0416* (2013.01); *G06F 3/016* (2013.01); *G06F 3/0488* (2013.01)

(58) Field of Classification Search
CPC ....... G06F 3/0416; G06F 3/016; G06F 3/0488
USPC ................................................. 345/173–175
See application file for complete search history.

(56) References Cited

U.S. PATENT DOCUMENTS

| | | | | |
|---|---|---|---|---|
| 8,188,981 B2* | 5/2012 | Shahoian | ............... | G06F 1/1616 345/156 |
| 8,686,952 B2* | 4/2014 | Burrough | ................ | G06F 3/016 345/156 |
| 8,786,409 B2* | 7/2014 | Zwart | ................... | G06F 1/1601 340/12.1 |
| 8,847,890 B2* | 9/2014 | Peterson | ................ | H01H 13/85 200/344 |
| 9,177,733 B2* | 11/2015 | Krumpelman | ......... | H01H 3/122 |
| 9,459,632 B2* | 10/2016 | Houston | ................ | G05D 19/02 |
| 9,471,109 B1* | 10/2016 | Chng | ..................... | G06F 1/1677 |
| 9,489,046 B2* | 11/2016 | Cruz-Hernandez | ..... | G06F 3/016 |
| 9,652,082 B1* | 5/2017 | Lin | ......................... | G06F 3/0421 |
| 9,727,142 B2* | 8/2017 | Levesque | ................ | G06F 3/016 |
| 9,733,710 B2* | 8/2017 | Cruz-Hernandez | ..... | G06F 3/016 |
| 9,829,979 B2* | 11/2017 | Brombach | ............. | B60K 37/02 |
| 9,952,705 B2* | 4/2018 | Kono | .................... | G06F 3/0416 |
| 10,031,582 B2* | 7/2018 | Modarres | ............... | G09G 5/003 |
| 10,078,391 B2* | 9/2018 | Aberg | ................... | G06F 3/0488 |
| 2002/0149561 A1* | 10/2002 | Fukumoto | .......... | G01C 21/3664 345/156 |

(Continued)

FOREIGN PATENT DOCUMENTS

| | | | |
|---|---|---|---|
| JP | 2013-097438 A | | 5/2013 |
| JP | 2013-235614 A | | 11/2013 |
| WO | 2014/034550 A1 | | 3/2014 |

*Primary Examiner* — Grant Sitta
(74) *Attorney, Agent, or Firm* — Oliff PLC

(57) ABSTRACT

There is provided an input device. A panel has an input operation surface. A detecting unit detects a user's touch operation on the input operation surface. A vibrating element can vibrate the panel, thereby capable of changing the frictional force of the input operation surface. A panel supporting unit supports the panel such that the panel can move in a direction parallel with or perpendicular to the input operation surface.

3 Claims, 12 Drawing Sheets

(56) References Cited

U.S. PATENT DOCUMENTS

| | | | |
|---|---|---|---|
| 2003/0038776 A1* | 2/2003 | Rosenberg | A63F 13/06 345/156 |
| 2004/0021643 A1* | 2/2004 | Hoshino | G06F 3/016 345/173 |
| 2004/0075676 A1* | 4/2004 | Rosenberg | A63F 13/06 715/701 |
| 2004/0233161 A1* | 11/2004 | Shahoian | G06F 3/016 345/156 |
| 2006/0109256 A1* | 5/2006 | Grant | G06F 3/016 345/173 |
| 2007/0091063 A1* | 4/2007 | Nakamura | G06F 3/016 345/156 |
| 2007/0244641 A1* | 10/2007 | Altan | B60Q 9/008 701/300 |
| 2008/0024459 A1* | 1/2008 | Poupyrev | G06F 3/016 345/173 |
| 2008/0062145 A1* | 3/2008 | Shahoian | G06F 1/1616 345/173 |
| 2008/0204427 A1* | 8/2008 | Heesemans | G06F 3/0414 345/174 |
| 2008/0251364 A1* | 10/2008 | Takala | G06F 3/01 200/341 |
| 2008/0303797 A1* | 12/2008 | Grothe | G06F 3/016 345/173 |
| 2009/0160793 A1* | 6/2009 | Rekimoto | G06F 3/0414 345/173 |
| 2009/0325647 A1* | 12/2009 | Cho | H04M 1/72519 455/567 |
| 2010/0001849 A1* | 1/2010 | Lee | G06F 3/016 340/407.2 |
| 2010/0004033 A1* | 1/2010 | Choe | G06F 1/1626 455/567 |
| 2010/0149111 A1* | 6/2010 | Olien | G06F 3/016 345/173 |
| 2010/0231367 A1* | 9/2010 | Cruz-Hernandez | G06F 3/016 340/407.2 |
| 2010/0245254 A1* | 9/2010 | Olien | G06F 3/016 345/173 |
| 2010/0253645 A1* | 10/2010 | Bolender | G06F 3/0414 345/174 |
| 2010/0295667 A1* | 11/2010 | Kyung | G06F 3/016 340/407.2 |
| 2011/0018695 A1* | 1/2011 | Bells | G06F 3/016 340/407.2 |
| 2011/0248916 A1* | 10/2011 | Griffin | G06F 3/016 345/157 |
| 2011/0264491 A1* | 10/2011 | Birnbaum | G06F 3/016 705/14.4 |
| 2012/0154330 A1* | 6/2012 | Shimizu | G06F 3/016 345/174 |
| 2012/0188066 A1* | 7/2012 | Ujii | G03B 17/38 340/407.2 |
| 2012/0232780 A1* | 9/2012 | Delson | A63F 13/06 701/400 |
| 2012/0235939 A1* | 9/2012 | Sakaguchi | G06F 3/016 345/173 |
| 2012/0326999 A1* | 12/2012 | Colgate | G06F 3/016 345/173 |
| 2013/0332892 A1* | 12/2013 | Matsuki | G06F 3/0488 715/863 |
| 2014/0118127 A1* | 5/2014 | Levesque | G06F 3/016 340/407.2 |
| 2015/0077534 A1* | 3/2015 | Derenne | G16H 40/63 348/77 |
| 2015/0145657 A1* | 5/2015 | Levesque | G06F 3/016 340/407.2 |
| 2015/0227200 A1* | 8/2015 | Norieda | G06F 3/041 345/173 |
| 2015/0227206 A1* | 8/2015 | Schuckle | G06F 3/016 345/173 |
| 2016/0162031 A1* | 6/2016 | Westerman | G06F 3/016 345/173 |
| 2016/0313795 A1* | 10/2016 | Muramatsu | H01L 41/0986 |
| 2016/0357257 A1* | 12/2016 | Lim | G06F 3/041 |

\* cited by examiner (a)　　　(b)

(a)　　　(b)

AUDIO DEVICE AND MENU DISPLAY METHOD OF AUDIO DEVICE

CROSS-REFERENCE TO RELATED APPLICATIONS

This application is based on and claims priority from Japanese Patent Application No. 2015-168209 filed on Aug. 27, 2015.

TECHNICAL FIELD

The present invention relates to an input device and an in-vehicle device.

BACKGROUND

In the related art, there is an input device which gives a predetermined feeling to a user in response to a touch operation on an input operation surface, thereby notifying the user that the input device has received the input. For example, the input device generates vibration in response to a user's pressing force, thereby notifying the user that the device has received the input (see Patent Document 1, for instance).

Patent Document 1: Japanese Patent Application Publication No. 2013-235614A

However, the input device according to the related art just generates vibration in response to a pressing force during a user's touch operation, and does not show any consideration as for what feeling is given in response to a touch operation.

SUMMARY

It is therefore an object of the present invention to provide an input device and an in-vehicle device capable of giving a novel feeling to a user.

According to an aspect of the embodiments of the present invention, there is provided an input device comprising: a panel that has an input operation surface; a detecting unit that detects a user's touch operation on the input operation surface; a vibrating element that can vibrate the panel, thereby capable of changing the frictional force of the input operation surface; and a panel supporting unit that supports the panel such that the panel can move in a direction parallel with or perpendicular to the input operation surface.

According to the present invention, it is possible to provide an input device and an in-vehicle device capable of giving a novel feeling to a user, thereby improving operability.

DETAILED DESCRIPTION OF THE EMBODIMENTS

Hereinafter, embodiments of an input device and an in-vehicle device including the input device according to the present invention will be described in detail with reference to the accompanying drawings. However, the present invention is not limited to the embodiments to be shown below.

First Embodiment

Figure 1:
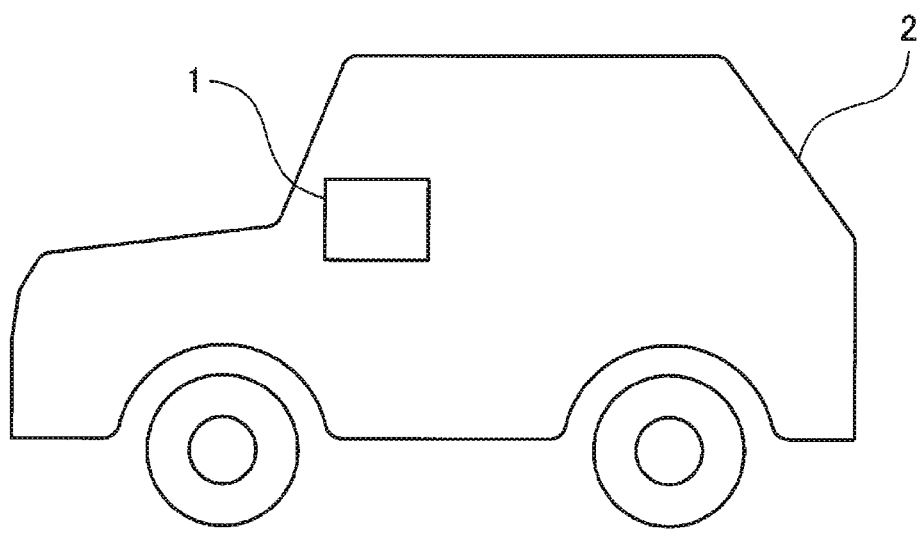
FIG. 1 is a schematic diagram illustrating a vehicle having an in-vehicle device according to a first embodiment.
Figure 2:
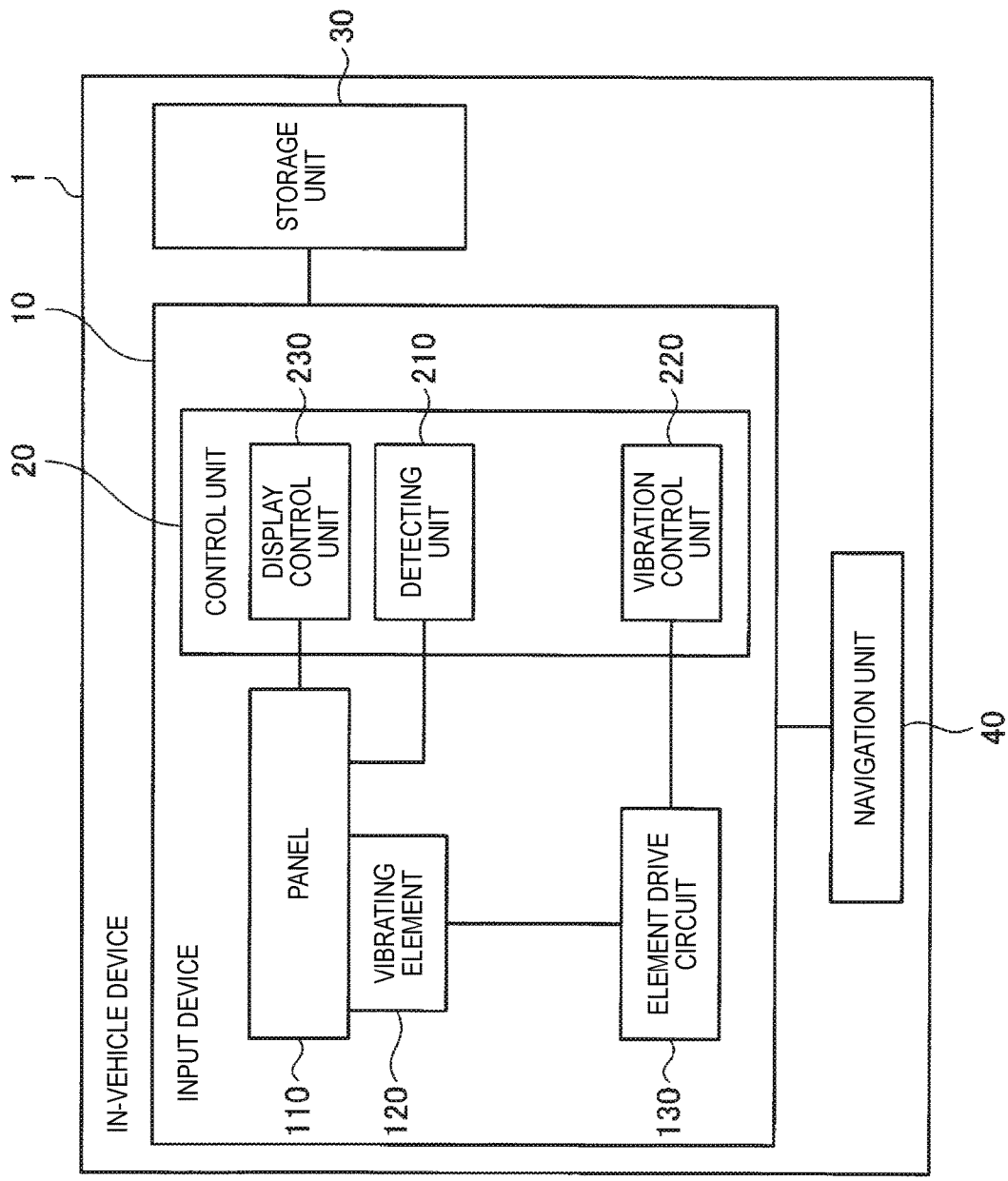
FIG. 2 is a block diagram illustrating the configuration of the in-vehicle device.
Figure 3:
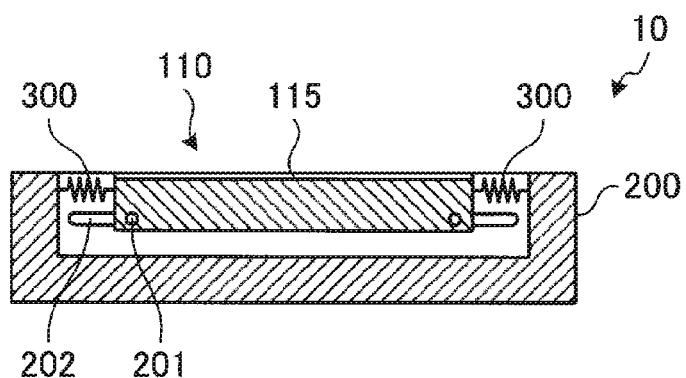
FIG. 3 is an explanatory view schematically illustrating an example of the structure of an input device which is included in the in-vehicle device.

FIG. 1 is a schematic diagram illustrating a vehicle having an in-vehicle device according to a first embodiment, and FIG. 2 is a block diagram illustrating the configuration of the in-vehicle device, and FIG. 3 is an explanatory view schematically illustrating an example of the structure of an input device which is included in the in-vehicle device.

As shown in FIG. 1, an in-vehicle device 1 according to the present embodiment constitutes, for example, a part of a car navigation system which is installed in a vehicle 2. Further, on the in-vehicle device 1, an input device 10 is mounted.

As shown in FIG. 2, the in-vehicle device 1 according to the present embodiment includes the input device 10, a storage unit 30, and a navigation unit 40.

The input device 10 is composed of, for example, a touch panel having an image display function. In other words, the input device 10 has a panel 110 configured by providing, for example, a transmissive input operation surface 115 using an electrostatic capacitance scheme, as a surface of a liquid crystal display which is an image display unit capable of displaying display images such as map images (FIG. 3).

Further, the input device 10 includes a control unit 20, which controls the operation of the input device 10 and performs a variety of control including a car navigation function. The control unit 20 is composed of a micro computer including a central processing unit (CPU), a read only memory (ROM), a random access memory (RAM), and so on.

The navigation unit 40 includes various components, such as control circuits and devices such as a location detector for performing a navigation function of guiding traveling of the vehicle 2, and control circuits and drives for performing an audio-related music reproduction function and a video reproduction function. Also, the location detector is composed of a magnetic field sensor for detecting absolute azimuth, a gyroscope for detecting Yaw angular velocity, a distance sensor for detecting the travel distance of the vehicle, a GPS receiver for receiving signals from artificial satellites for a global position system (GPS), and so on.

The storage unit 30 is composed of a hard disk, a flash memory, and the like, and is for storing a variety of data such as map information, programs and necessary data for a variety of control to be performed by the control unit 20, and so on. For example, the storage unit retains programs such as a feeling control program for changing the frictional force of the input operation surface 115 in response to a user's input operation on the input device 10 when the input operation is performed, thereby changing a feeling during the user's touch operation. For example, according to the feeling control program, the control unit 20 can perform switching between a first vibration mode for giving a user a feeling as if a finger F (see FIGS. 5A to 6C) slides and a second vibration mode for giving the user a feeling as if the finger F adheres to the input operation surface 115.

Now, the input device 10 according to the present embodiment will be described in more detail. As shown in FIG. 2, on the panel 110 which is included in the input device 10, a vibrating element 120 capable of vibrating the panel 110 at ultrasonic frequency (at high frequency) is attached. As the vibrating element 120, for example, a piezo element (a piezoelectric element) can be used. The vibrating element 120 can vibrate the panel 110 at ultrasonic frequency as will be described below, thereby capable of changing the frictional force of the input operation surface 115. Further, in the input device 10, an element drive circuit 130 for driving the vibrating element 120 is provided.

Although a configuration using a piezo element as the vibrating element 120 has been described, any other configuration can be used as long as it is possible to vibrate the input operation surface 115 in an ultrasonic frequency band.

The control unit 20 includes a detecting unit 210, a vibration control unit 220, and a display control unit 230. The detecting unit 210 detects touch operations, which include the touch position of the user's finger F (see FIGS. 5A to 6C) or a pointing device such as a stylus pen, on the input operation surface 115, and movement of the finger or the pointing device. For example, in a case where the detecting unit 210 is configured to detect a user's touch position at predetermined intervals, for example, even if the user's finger F moves on the input operation surface 115, whereby the touch position varies, the detecting unit 210 can detect the touch position following that change. The detecting unit 210 outputs the position of the user's touch as the detection result to the vibration control unit 220 and the display control unit 230. The following description will be made on the assumption that the user performs a touch operation on the input operation surface 115 with the finger F.

The vibration control unit 220 controls the element drive circuit 130 on the basis of the detection result of the detecting unit 210, thereby changing the vibration state of the vibrating element 120, thereby changing the frictional force of the input operation surface 115 of the panel 110. In other words, the vibration control unit 220 can change the frictional force by using a so-called squeeze effect, thereby capable of performing switching between the first vibration mode and the second vibration mode.

Here, the squeeze effect means a phenomenon that, if the vibrating element 120 vibrates the input device 10 at ultrasonic frequency, the vibration changes pressure in a gap between the finger F and the input operation surface 115, whereby air is sucked into the gap and forms an air layer, whereby the friction resistance between the finger F and the input operation surface 115 becomes relatively lower than that in a case where the input operation surface does not vibrate.

The display control unit 230 generates images to be displayed on the liquid crystal display and performs image display control, if receiving input operations on the basis of user's touch operations on the input operation surface 115.

Also, as shown in FIG. 3, the input device 10 according to the present embodiment includes a housing 200 for holding the panel 110. In the housing 200, the panel 110 is held with panel supporting units interposed therebetween and having elastic members 300. The panel supporting units according to the present embodiment have, for example, compression springs as the elastic members 300, and support the panel 110 by the compression springs such that the panel is movable along the input operation surface 115.

Also, as shown in FIG. 3, in the inner surface of the housing 200, a rail groove 202 is formed, and on the side surface of the panel 110, a protrusion 201 is formed such that the protrusion can be loosely fit into the rail groove 202 so as to be slidable. According to this configuration, the panel 110 can be supported by the panel supporting units such that the panel can move in parallel with the input operation surface 115. Also, although not shown in FIG. 3, the panel 110 is configured to be movable in parallel with the input operation surface 115, not only in the left-right direction of FIG. 3 but also in the front-rear direction. In other words, the panel 110 is configured to be movable in parallel with an X direction and a Y direction.

In other words, the panel supporting units have the elastic members 300 as main elements. When the user performs a touch operation (an input operation) on the input operation surface 115, friction according to the touch operation causes propulsion of the panel 110, and the elastic members resist the propulsion. Also, although not shown in FIG. 3, on the panel 110, the vibrating element 120 is provided.

If the vibrating element 120 is driven, as described above, the panel 110 vibrates at ultrasonic frequency, whereby a thin air layer is formed on the surface of the panel 110, that is, on the input operation surface 115. If an air layer is formed on the surface of the input operation surface 115, the frictional force becomes relatively small, whereby sliding of the finger F becomes very smooth. As described above, if the frictional force of the input operation surface 115 decreases, the user can get a feeling as if the finger F is sliding on the input operation surface 115.

Meanwhile, in a case where driving of the vibrating element 120 is in a stop state, since an air layer is not formed on the input operation surface 115, the frictional force of the input operation surface 115 becomes relatively large. If the frictional force of the input operation surface 115 increases, the user can get a feeling as if the adhesiveness of the finger F to the input operation surface 115 has increased. Moreover, since the input device 10 includes the panel supporting units having the elastic members 300, the user can get a feeling according to adhesion based on the high degree of adhesiveness of the finger F to the input operation surface 115.

The user can get the feeling according to adhesion on the basis of the following effect. In other words, when the vibrating element 120 is in the stop state and thus the frictional force of the input operation surface 115 is large, the frictional force causes the panel 110 to move in the same direction as the movement direction of the finger F as the finger F moves. In this case, the panel supporting units having the elastic members 300 resist the propulsion of the panel 110. Moreover, if the user keeps moving the panel against the elastic members 300, since the resistance to sliding of the finger F gradually increases, and the user increases the pressing force in response to the increase in the resistance, the user gets a feeling as if the finger F adheres to the input operation surface 115.

Also, if the moving distance of the finger F increases, the user can get a feeling as if the finger is caught at intervals. In other words, if the resistance exceeds the frictional force while the finger F is moving, the panel 110 slides in the direction of the resistance until the resistance becomes sufficiently small. Thereafter, the panel 110 moves again as described above, and then slides. Since this situation is repeated, the user can get a feeling as if the finger is caught at intervals.

As described above, the input device 10 according to the present embodiment can change the magnitude of friction during a touch operation of the finger F on the input operation surface 115, thereby capable of changing the feeling of the user during the touch operation.

Figure 4:
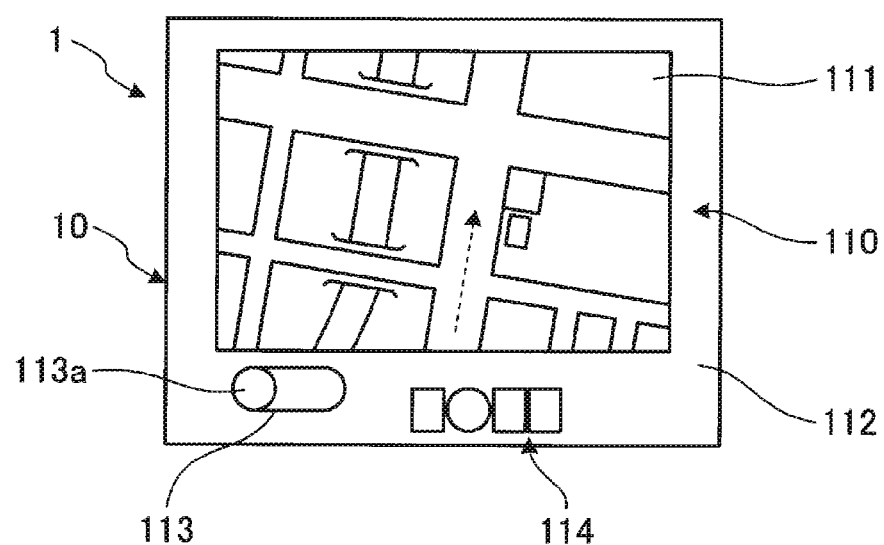
FIG. 4 is an explanatory view illustrating an image display unit of the input device.

Now, an example of an input operation using the input device 10 according to the present embodiment will be described. FIG. 4 is an explanatory view illustrating an image display unit 112 of the panel 110 of the input device 10 which is included in the in-vehicle device 1.

On the image display unit 112 which is visible through the input operation surface 115 of the panel 110, it is possible to display a map image 111 which is map information including a place where the vehicle 2 is located, as shown in FIG. 4.

Also, as shown in FIG. 4, on the image display unit 112, for example, a switch image 113 representing a slide switch for turning on or off the car navigation function is displayed. A reference symbol "113a" represents the knob of the slide switch. Also, on the image display unit 112, an image of an operation switch unit 114 is displayed. By a touch operation on the operation switch unit 114, for example, it is possible to switch display from the map image 111 to an image related to audio information, any other image information, or the like.

Figure 5A:
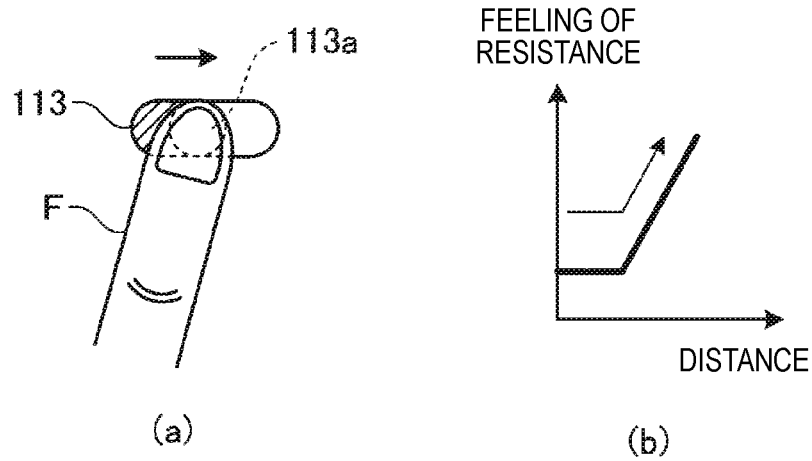
FIG. 5A is an explanatory view illustrating variation in a feeling during a touch operation on a predetermined display element.
Figure 5B:
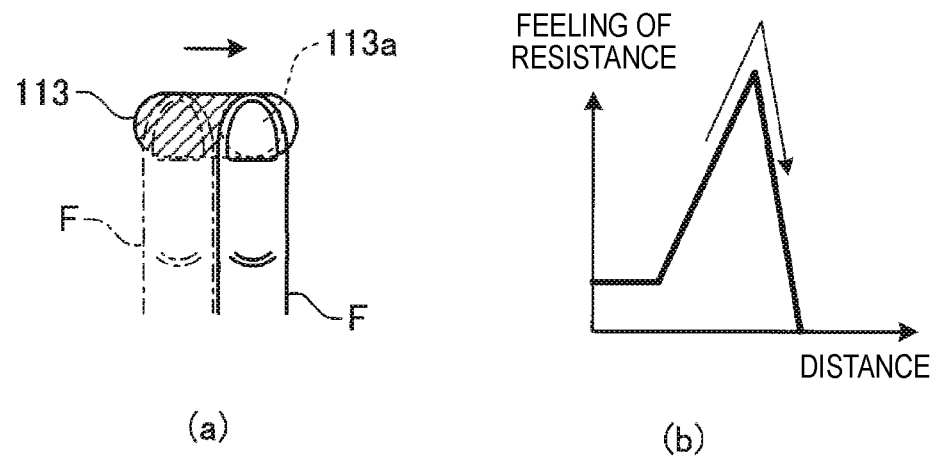
FIG. 5B is an explanatory view illustrating variation in a feeling during a touch operation on a predetermined display element.
Figure 6A:
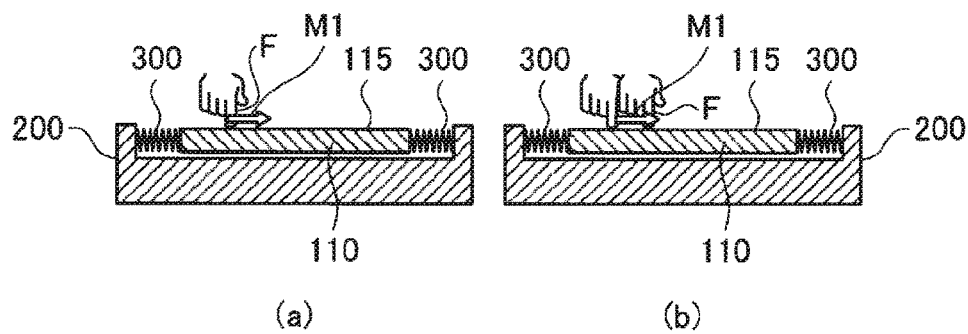
FIG. 6A is an explanatory view illustrating a first stage of a touch operation on an input operation surface of the input device.
Figure 6B:
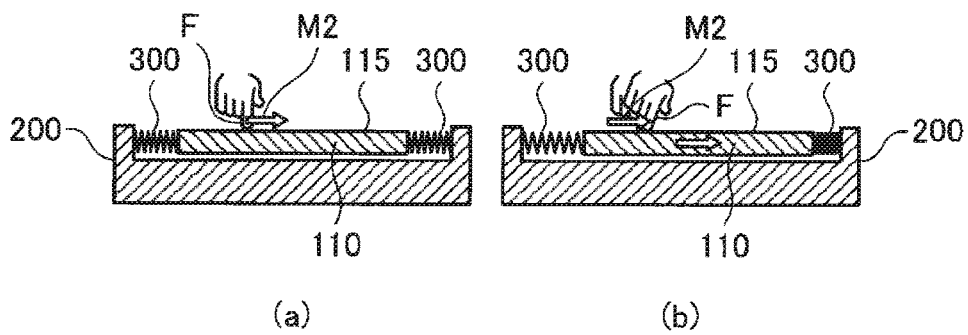
FIG. 6B is an explanatory view illustrating a second stage of the touch operation on the input operation surface of the input device.
Figure 6C:
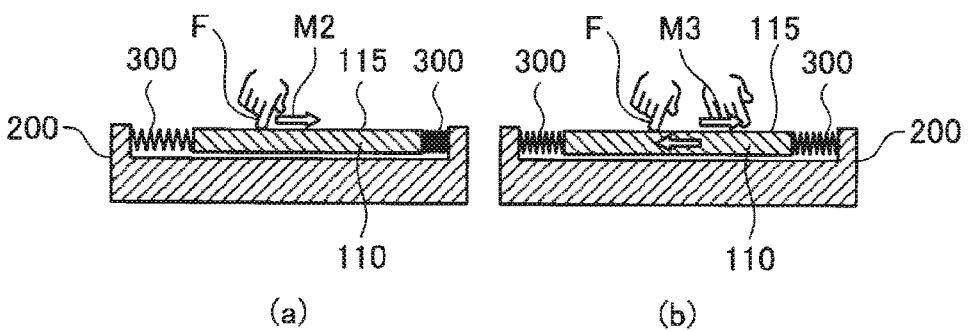
FIG. 6C is an explanatory view illustrating a third stage of the touch operation on the input operation surface of the input device.
Figure 7:
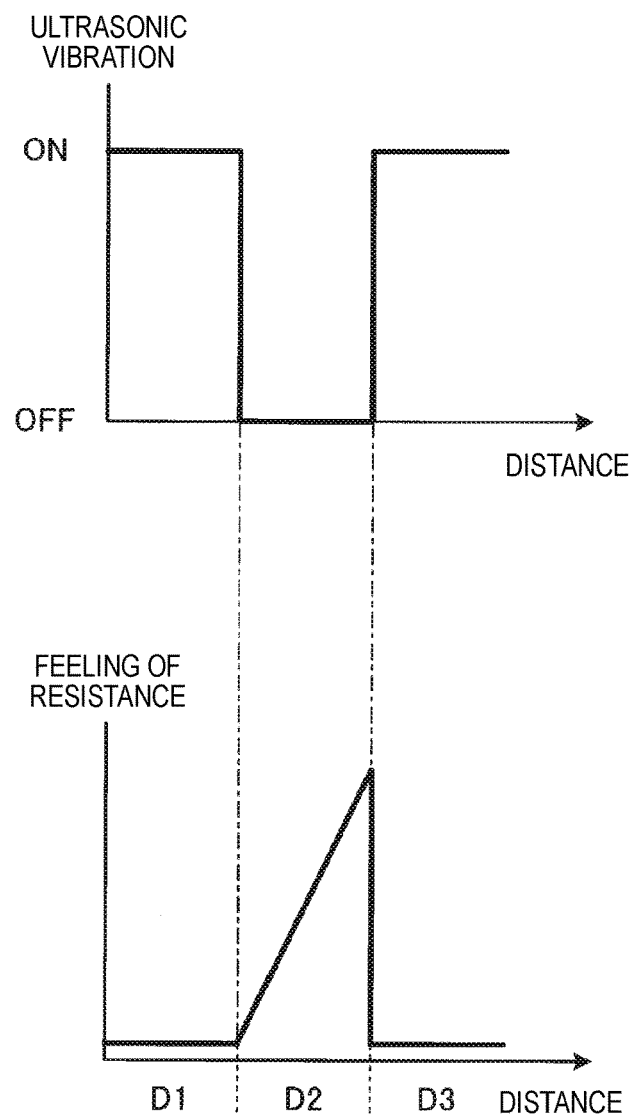
FIG. 7 is an explanatory view illustrating variation in a feeling during a touch operation on the input operation surface.

Hereinafter, variation in a feeling in a case of performing a touch operation on the switch image 113 using the input device 10 according to the present embodiment will be described with reference to some drawings. FIGS. 5A and 5B are explanatory views illustrating variation in a feeling during a touch operation on a predetermined display element, and FIGS. 6A to 6C are explanatory views illustrating the first stage to third stage of a touch operation on the input operation surface 115 of the input device 10. Also, FIG. 7 is an explanatory view illustrating variation in a feeling during a touch operation on the input operation surface 115.

The input device 10 sets a predetermined operation area according to the switch image 113 which is a user's operation target. In other words, an operation area is set according to a length and a width in the left-right direction based on the frame of the switch image 113 of FIG. 4.

Thereafter, if the user touches the input operation surface 115 with the finger F, the input device 10 detects the position of the touch, and controls the vibrating element 120 according to the detected touch position, thereby giving a feeling depending on the position of the finger F on the operation area. In other words, in response to the touch position of the user's finger F, the input device 10 gives a feeling as if the finger F is sliding or a feeling as if the finger F is adhering to the input operation surface 115, by using the squeeze effect described above.

For example, if the finger F of the user moves from a position shown in (a) of FIG. 5A to a position shown in (a) of FIG. 5B, the feeling of the finger F of the user changes from a feeling shown in (b) of FIG. 5A to a feeling shown in (b) of FIG. 5B.

In other words, if the user slides the finger F to the right in a state where the finger is in contact with the knob 113a of the slider 61, driving of the vibrating element 120 stops. In this case, since the adhesion between the finger F and the input operation surface 115 is high, the panel 110 also moves along with the finger F, whereby the user feels resistance as if the user moves the knob 113a. If the knob 113a is located near an end point, the vibrating element 120 is driven, whereby the squeeze effect is produced. As a result, the frictional force between the finger F and the input operation surface 115 decreases, whereby the panel 110 returns to its original position. For this reason, the finger F of the user feels resilience like a toggle switch has passed its fulcrum.

Specifically, this variation in the feeling can use, for example, a vibration property pattern (a vibration pattern) preset with respect to movement distance. Also, at least one vibration pattern may be stored in advance. In other words, in a case where such vibration patterns are stored in the storage unit 30 in advance, and a touch operation of the finger F is detected, the input device needs only to read out a vibration pattern corresponding to the position of the finger F (the operation position) during the touch operation, from the storage unit 30, and use the read vibration pattern to control the vibration property according to the movement distance of the finger F.

As described above, according to the input device 10 of the present embodiment, since the input device includes the panel 110 which has the squeeze effect, and the elastic members 300 which support the panel 110, in a case where the finger F touches the input operation surface 115, it is possible to give the finger a novel feeling such as a feeling of stronger resistance or resilience. Therefore, for example, without seeing the input operation surface 115, the user can recognize an input operation state by only the feeling of the finger F. Therefore, operability is significantly improved.

Also, in the present embodiment, during a touch operation, it is possible to give the user a novel feeling as described above. Therefore, the degree of variation in the feeling is greater than the degree of variation in a feeling in a case of using only the squeeze effect, and thus it is easy to recognize variation in feeling. In a case where the input device 10 makes it easy to recognize variation in a feeling as described above, if the input device is used in the in-vehicle device 1 like in the present embodiment, even when the vehicle 2 is vibrating due to driving of its engine, it is possible to perform more accurate input operations.

Variation in the feeling during the input operation described above will be described in more detail with reference to FIGS. 6A to 6C and FIG. 7. Although not shown in FIGS. 6A to 6C, the vibrating element 120 has been attached to the panel 110.

It is assumed that the user is touching the input operation surface 115 of the panel 110 with the finger F as shown in (a) of FIG. 6A. For example, in a case where the touch position is the position of the knob 113a of the switch image 113 of FIG. 4, the vibration control unit 220 of the input device 10 controls the element drive circuit 130, thereby performing switching to the first vibration mode for giving the user a feeling as if the finger F slides. In other words, the vibration control unit 220 drives the vibrating element 120, thereby vibrating the input operation surface 115 at ultrasonic frequency. Thereafter, the vibration control unit 220 keeps the first vibration mode until the touch state becomes a state shown in (b) of FIG. 6A. In other words, the vibration control unit keeps the first vibration mode while the finger F slightly slides to the right (as shown by an arrow M1).

The movement distance of the finger F corresponding to the arrow M1 is shown by D1 in FIG. 7. As described above, while the finger F moves by the distance D1, the input device is controlled in the first vibration mode, and the vibrating element 120 is driven so as to become an ON state, whereby the user gets a feeling as if the finger F slides on the input operation surface 115, due to the squeeze effect.

Thereafter, if the finger F of the user moves to a predetermined position as shown in (a) of FIG. 6B, the vibration control unit 220 of the input device 10 controls the element drive circuit 130, thereby performing switching to the second vibration mode for giving the user a feeling as if the finger F adheres to the input operation surface 115. In other words, the vibration control unit 220 stops the driving of the vibrating element 120, thereby performing switching to the second vibration mode. Thereafter, the vibration control unit 220 keeps the second vibration mode until the touch state becomes a state shown in (b) of FIG. 6B. At this time, since the frictional force between the finger F and the input operation surface 115 is relatively large, the frictional force causes the panel 110 to move in the same direction as the movement direction of the finger F as the finger F moves. At this time, the elastic members (springs) 300 of the panel supporting units resist the propulsion of the panel 110, and as an elastic member 300 contracts, the panel 110 moves (as shown by an arrow M2).

The movement distance of the finger F corresponding to the arrow M2 is shown by D2 in FIG. 7. Within the movement distance D2 of the panel 110 according to the contraction of the corresponding elastic member 300, resistance to movement of the finger F gradually increases as shown in FIG. 7. At this time, since the user increases the pressing force in response to that resistance, the user can get a feeling as if the finger F adheres to the input operation surface 115.

Thereafter, as shown in (a) of FIG. 6C, the finger F of the user moves the panel 110 to a position where the corresponding elastic member 300 become shortest, that is, the position of the right end of the switch image 113 (as shown by an arrow M3). Then, the vibration control unit 220 controls the element drive circuit 130, thereby driving the vibrating element 120 again such that the vibrating element returns to the first vibration mode for vibrating the input operation surface 115 at ultrasonic frequency.

The movement distance of the finger F corresponding to the arrow M3 is shown by D3 in FIG. 7. In other words, if the vibrating element 120 is driven so as to become the ON state, as shown in FIG. 7, the frictional force becomes relatively small due to the squeeze effect. As a result, the elastic member 300 being in a balance with the frictional force extends, whereby the panel 110 slides toward its original position. At this time, the input operation surface 115 slides as if it moves while rubbing the touch surface of the finger F. In other words, the user can get a feeling as if the finger F quickly slides on the input operation surface 115. Therefore, the finger F feels resilience as if a toggle switch has passed its fulcrum. Since this novel feeling is given, for example, during an operation on the switch, the user can surely recognize that the switch has been turned on or off, on the basis of only the feeling, without seeing the switch.

As described above, in the input device 10 according to the present, the control unit 20 can switch the vibrating element 120 between a driving state and a stop state according to the display position of a predetermined display element which is displayed while being moved on the basis of a touch operation on the input operation surface 115, for example, the display position of the knob 113a of the switch image 113.

Therefore, according to the input device 10 of the present embodiment, for example, during an operation using the switch image 113, the user can get a feeling as if the user is operating an actual slide switch with the finger F, and it is possible to improve operability of the touch panel.

In the above described example, an input operation using the switch image 113 displayed on the input device 10 has been described. However, even with respect to an image of the operation switch unit 114 which is displayed similarly, it is possible to appropriately distinguish between a first vibration mode and a second vibration mode according to uses of those modes, and give the user different feelings depending on those vibration modes, thereby capable of improving operability.

Figure 8:
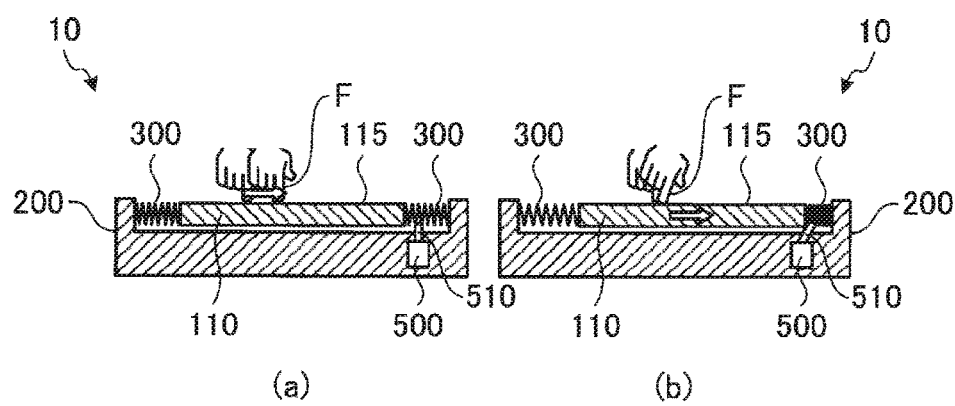
FIG. 8 is an explanatory view illustrating a case of using a panel of the input device as an actuator.

Also, instead of an operation on the image of the switch or the like which is displayed as described above, the input device 10 according to the present embodiment can use, for example, the panel 110 as a switch. FIG. 8 is an explanatory view illustrating a case of using the panel 110 as an actuator.

As shown in FIG. 8, in the housing 200 which holds the panel 110, a mechanical switch 500 is installed in advance. In this case, the switch 500 is installed such that a switch lever 510 is positioned on the bottom of the housing 200 so as to face the inside and be movable between an ON position and an OFF position. Also, the installation position is set to a position appropriate for turning on and off the switch. In this case, the switch lever 510 is positioned in a space which is formed between one end portion of the panel 110 and one inner surface of the housing 200. Although not shown even in FIG. 8, the vibrating element 120 has been attached to the panel 110.

In this configuration, for example, if the finger F comes into contact with the input operation surface 115 as shown in (a) of FIG. 8, first, the input device 10 is set to the first vibration mode. In other words, the input device 10 decreases the frictional force of the input operation surface 115 by the squeeze effect, thereby giving the user a feeling as if the finger F slides, thereby notifying the user that the input device has received the operation.

Thereafter, the input device 10 is switched to the second vibration mode. In other words, the input device 10 makes the frictional force of the input operation surface 115 relatively large, thereby giving the user a feeling as if the finger F adheres to the input operation surface 115. Then, since the frictional force between the finger F and the input operation surface 115 is large, as shown in (b) of FIG. 8, as the finger F moves, the panel 110 also moves, thereby pushing the switch lever 510 with the end portion of the panel 110. In this way, for example, an operation for turning on or off the switch 500 is performed.

Thereafter, for example, if switching to the first vibration mode is performed, since the frictional force becomes relatively small due to the squeeze effect, an elastic member 300 being in a balance with the frictional force extends, whereby the panel 110 slides toward its original position. In other words, even in this case, since the input operation surface 115 slides as if it moves while rubbing the touch surface of the finger F, during an operation for turning on the switch 500, the finger F feels resilience as if a toggle switch has passed its fulcrum.

Also, in the case of using the panel 110 as an actuator as described above, if the finger F comes into contact with the input operation surface 115 during start of an input operation, the input device 10 can be set to the second vibration mode without being setting to the first vibration mode.

Although an operation for turning on or off the switch using the panel 110 as an actuator has been described, the present invention is not limited thereto, and it is also possible to perform a slide operation on a slide position sensor using the panel 110 as an actuator.

Like this, according to the input device 10 of the present embodiment, it is possible to perform an operation on an ON/OFF switch or a slide position sensor using the panel 110 as an actuator. Further, it is possible to appropriately perform switching between the first vibration mode and the second vibration mode according to the position of the finger F during an input operation, resulting in a change in feeling, thereby capable of improving operability.

Also, since the panel 110 is supported by the panel supporting units such that the panel is movable along the input operation surface 115, the input device 10 can use not only the squeeze effect using the vibrating element 120 but also movement of the panel 110, whereby a touch operation based on a novel feeling becomes possible.

Figure 9:
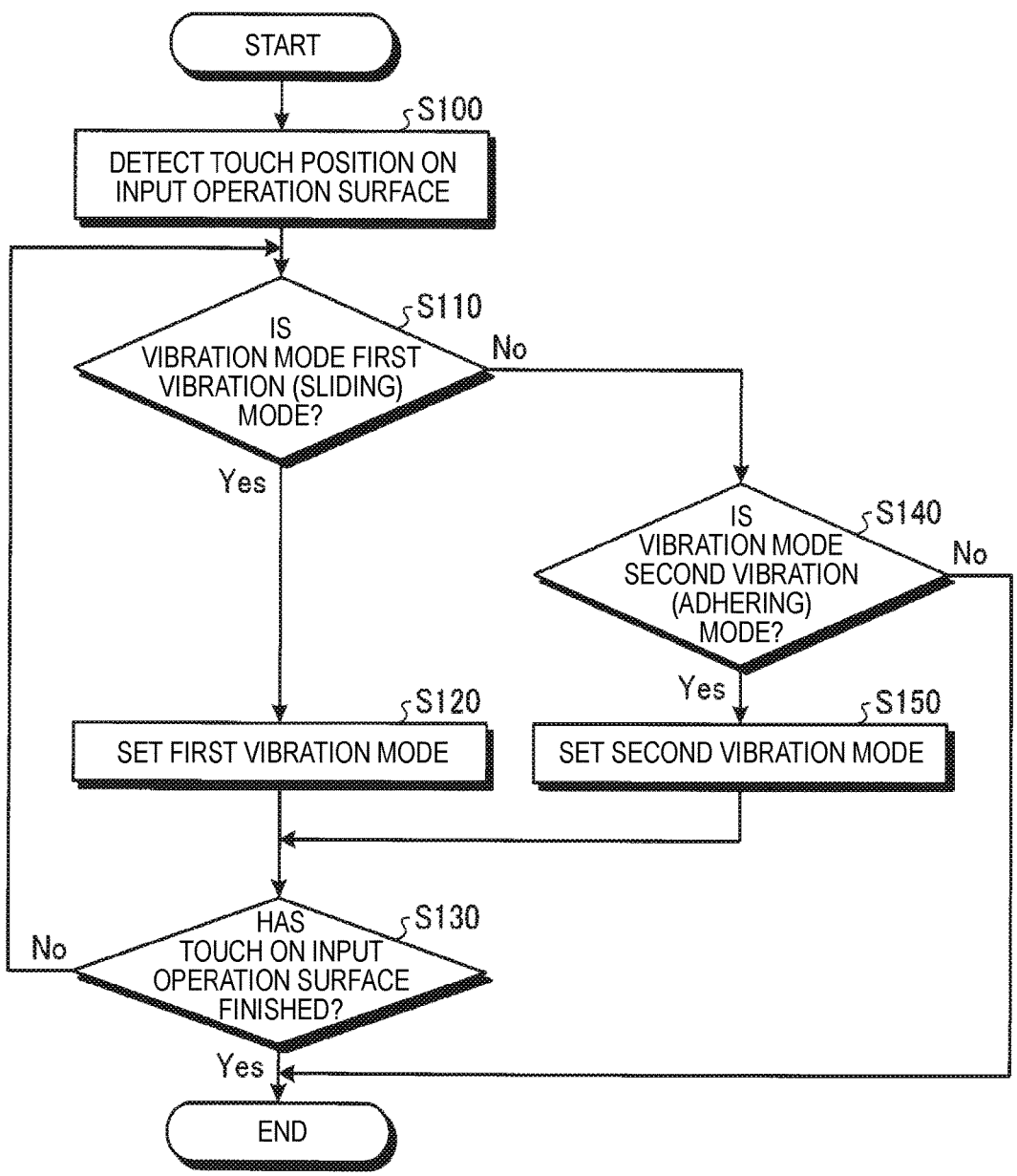
FIG. 9 is a flow chart illustrating the procedure of a feeling control process of the input device.

Now, a procedure in which the input device 10 according to the present embodiment performs a feeling control process of appropriately performing switching between the first vibration mode and the second vibration mode as described above will be described with reference to FIG. 9. FIG. 9 is a flow chart illustrating the procedure of the feeling control process of the input device 10 according to the embodiment.

As shown in FIG. 9, in STEP S100, the control unit 20 of the input device 10 detects the position of a touch of the finger F on the input operation surface 115 by the detecting unit 210. In other words, the detecting unit 210 detects the touch position of the finger F in an operation area preset in association with a display image (for example, the switch image 113).

Subsequently, in STEP S110, the control unit 20 determines whether the vibration mode based on the detection position of the finger F is the first vibration mode. On the occasion of this determination, the control unit 20 determines whether the vibration mode is the first vibration mode or the second vibration mode, on the basis of the position of the operation area associated with the display image. More specifically, in the storage unit 30 of the input device 10, vibration modes assigned to the positions of operation areas are stored, for example, as information stored in a table, in advance, and the control unit 20 performs determination on the basis of the corresponding table.

In a case of determining that the vibration mode based on the detection position of the finger F is the first vibration mode ("Yes" in STEP S110), in STEP S120, the control unit 20 sets the first vibration mode. In other words, the control unit 20 controls the element drive circuit 130 such that the first vibration mode is performed, whereby the vibrating element 120 is driven and vibrates the input operation surface 115 of the panel 110 at ultrasonic frequency.

Meanwhile, in a case of determining that the vibration mode based on the detection position of the finger F is not the first vibration mode ("No" in STEP S110), in STEP S140, the control unit 20 determines whether the vibration mode assigned to the detection position is the second vibration mode.

In a case of determining that the vibration mode assigned to the detection position of the finger F is the second vibration mode ("Yes" in STEP S140), in STEP S150, the control unit 20 sets the second vibration mode. Meanwhile, in a case of determining that the vibration mode is not the second vibration mode ("No" in STEP S140), the control unit 20 finishes the feeling control process. In STEP S150, the control unit 20 controls the element drive circuit 130 such that the second vibration mode is performed. Specifically, the control unit stops the vibrating element 120.

After the first vibration mode is performed in STEP S120, or after the second vibration mode is performed in STEP S150, in STEP S130, the control unit 20 determines whether the touch of the finger F on the input operation surface 115 has finished. If determining that the touch has not finished ("No" in STEP S130), the control unit repeats the process from STEP S110. Meanwhile, in a case of determining that the user has taken the finger F off the input operation surface 115, whereby the touch operation has finished ("Yes" in STEP S130), the control unit 20 finishes the feeling control process.

As described above, according to positions on display images which are touched by the user's finger F, the input device 10 can be appropriately switched between the vibration modes, thereby capable of giving the user different feelings. Further, according to the input device 10 of the present embodiment, since switching between the vibration modes and horizontal movement of the panel 110 are combined, it is possible to give the user an unprecedented novel feeling such as a feeling of resilience.

Second Embodiment

Figure 10:
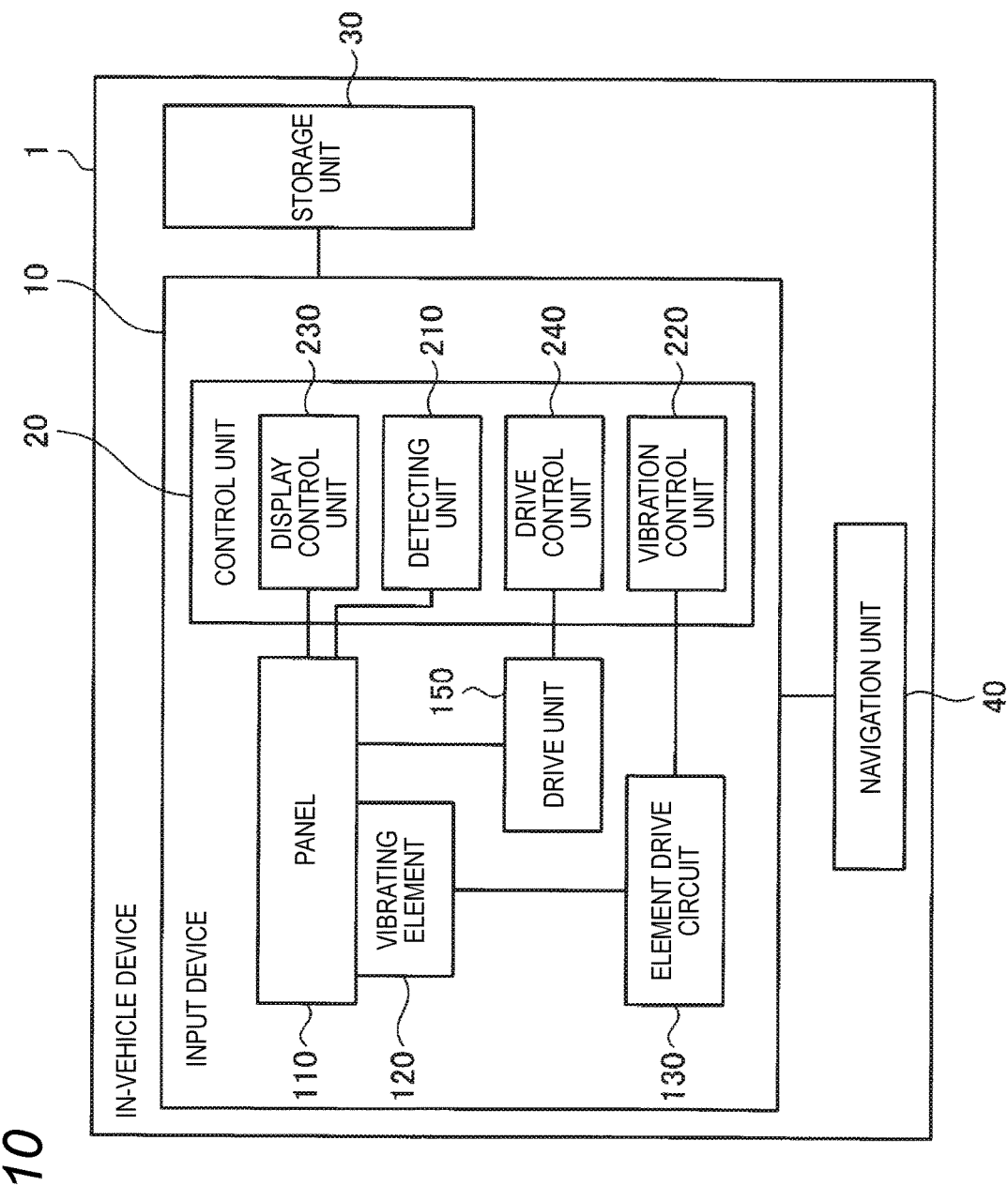
FIG. 10 is a block diagram illustrating the configuration of an in-vehicle device including an input device according to a second embodiment.
Figure 11:
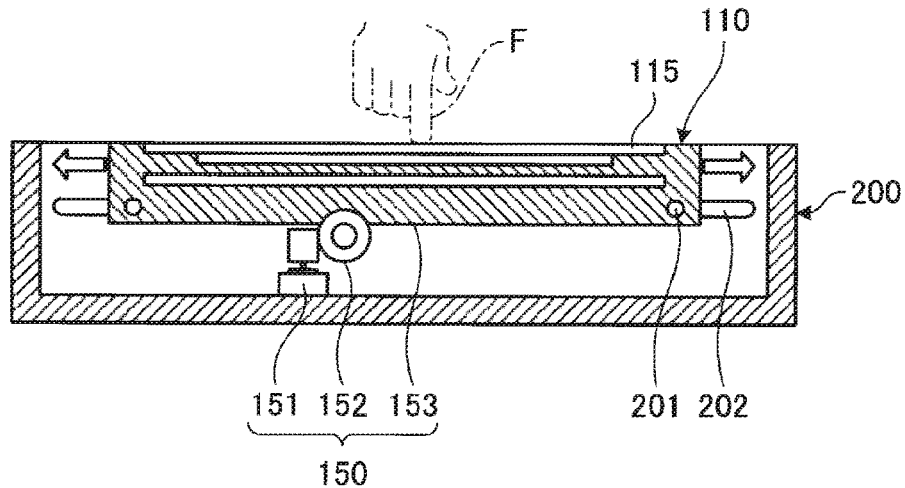
FIG. 11 is an explanatory view schematically illustrating an example of the structure of the input device of FIG. 10.

Now, an input device 10 according to a second embodiment, and an in-vehicle device 1 including the corresponding input device 10 will be described with reference to some drawings. FIG. 10 is a block diagram illustrating the configuration of the in-vehicle device 1 including the input device 10 according to the second embodiment, and FIG. 11 is an explanatory view schematically illustrating an example of the structure of the input device 10 of FIG. 10. In the following description, components identical to those of the first engagement portion are denoted by the same reference symbols, and will not be described in detail.

The input device 10 according to the second embodiment is different from that of the first embodiment, in that it has, as a panel supporting unit, a drive unit 150 capable of forcibly drive the panel 110, and the control unit 20 includes a drive control unit 240 for controlling the drive unit 150.

In the present embodiment, as shown in FIG. 11, the drive unit 150 includes a motor 151, a speed reducing mechanism 152 which is composed of a speed reducer and a gear group, and rotates a pinion at low speed if receiving an output of the motor 151, and a rack 153 which is installed on the lower surface of the panel 110 and is engaged with the pinion of the speed reducing mechanism 152.

As described above, the input device 10 according to the present embodiment includes the drive unit 150 capable of forcibly driving the panel 110, as a panel supporting unit for supporting the panel 110 such that the panel is movable in parallel with the input operation surface 115.

According to this configuration, for example, even in a case where the user touches the input operation surface 115 with the finger F, and holds the finger at the touch position, if the drive unit 150 is driven to move the panel 110, it is possible to give a feeling to the finger F. Also, if the panel 110 is horizontally moved, it is possible to guide the position of the finger F.

For example, in a case where two display images representing button switches are displayed side by side on the input operation surface 115, if the user touches one button switch, only the panel 110 is driven in the horizontal direction; whereas if the user touches the other button switch, the panel 110 is driven in the horizontal direction while the vibrating element 120 is driven. In this way, it is possible to give feelings according to the squeeze effect. Alternatively, in the case where the user touches the other button switch, it is possible to stop the drive unit 150 and drive only the vibrating element 120.

As described above, the drive unit 150 can forcibly move the panel 110 in the horizontal direction, and the vibrating element 120 can change the frictional force of the input operation surface 115, and the input device 10 according to the present embodiment can appropriately switch the driving states of the drive unit and the vibrating element. Therefore, it is possible to give different feelings depending on the types of input operations, thereby capable of improving operability.

Figure 12:
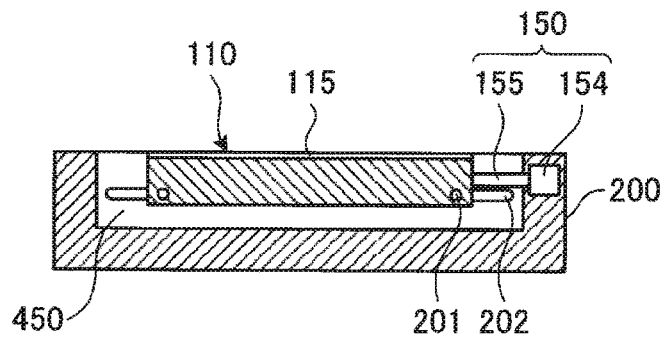
FIG. 12 is an explanatory view schematically illustrating a modification of the structure of the input device of FIG. 10.

FIG. 12 is an explanatory view schematically illustrating a modification of the structure of the input device 10 according to the second embodiment described above. In this modification, as shown in FIG. 12, the drive unit 150 uses an actuator 154 such as a solenoid, in place of the motor 151 and the like, and the panel 110 is connected to the leading end of an advance/retreat rod 155 of the actuator 154.

Even according to this configuration, the drive unit 150 can forcibly the panel 110 in the horizontal direction, that is, in parallel with the input operation surface 115.

Third Embodiment

Figure 13:
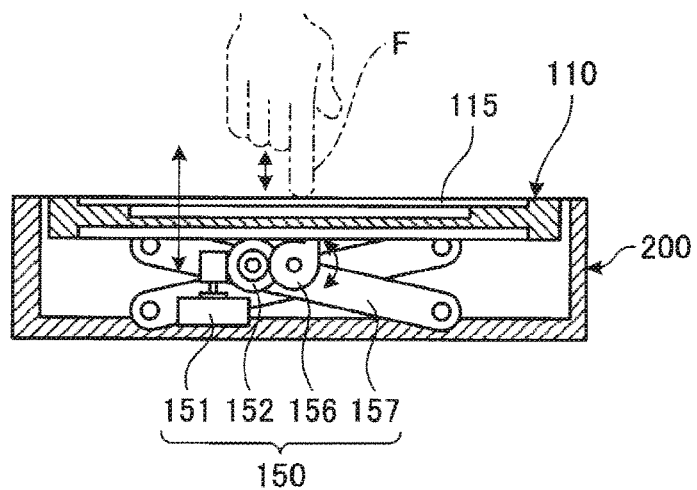
FIG. 13 is an explanatory view schematically illustrating an example of the structure of an input device according to a third embodiment.
Figure 14A:
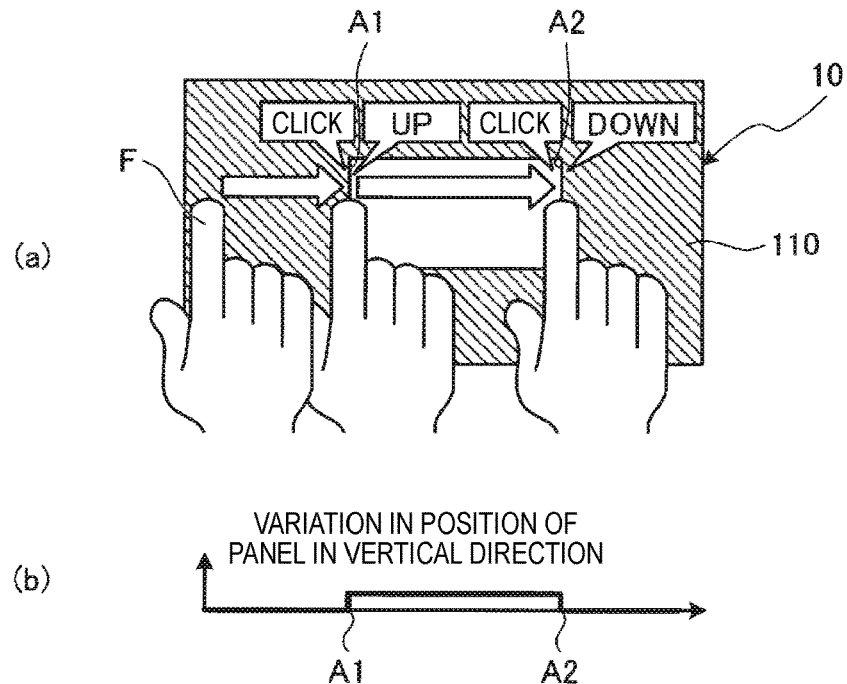
FIG. 14A is an explanatory view illustrating an example of an operation on the input device of FIG. 13.
Figure 14B:
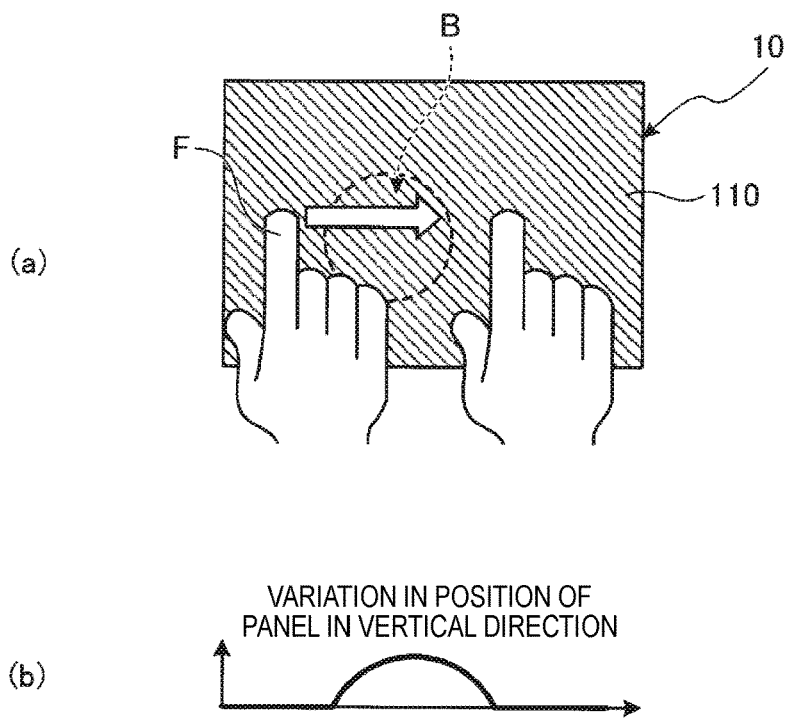
FIG. 14B is an explanatory view illustrating an example of an operation on the input device of FIG. 13.

Now, an input device 10 according to a third embodiment will be described with reference to some drawings. FIG. 13 is an explanatory view schematically illustrating an example of the structure of the input device 10 according to the third embodiment. Also, FIG. 14A and FIG. 14B are explanatory views illustrating examples of operations on the input device 10. In the following description, components identical to those of the first or second embodiment are denoted by the same reference symbols, and will not be described in detail.

The input device 10 according to the third embodiment is different from the input device 10 according to the second embodiment, in that a drive unit 150 which is a panel supporting unit moves the panel 110 in a direction perpendicular to the input operation surface 115.

In other words, the drive unit 150 according to the present embodiment includes not only a motor 151, and a speed reducing mechanism 152 which is composed of a speed reducer and a gear group and rotates a pinion at low speed if receiving an output of the motor 151, but also a vertical movement mechanism. The vertical movement mechanism is configured to have a rotary member 156 which can rotate in a normal direction and a reverse direction (for example, in a clockwise direction and a counterclockwise direction) if receiving torque from the speed reducing mechanism 152, and a pantograph mechanism 157 which is installed between the panel 110 and the bottom of the housing 200 and supports the panel such that the panel can move in a vertical direction. In other words, the input device 10 according to the third embodiment has the drive unit 150, which includes the motor 151, the speed reducing mechanism 152, the rotary member 156, and the pantograph mechanism 157.

As described above, the input device 10 according to the present embodiment has the drive unit 150 capable of forcibly moving the panel 110 in the direction perpendicular to the input operation surface 115, as a panel supporting unit which supports the panel 110 such that the panel can move.

If this input device 10 is used, it is possible to give a more novel feeling to the user which performs a touch operation, through the input operation surface 115. In other words, the control unit 20 can change the driving state of the drive unit 150 on the basis of the detection result of the detecting unit 210, whereby it is possible to give a three-dimensional novel feeling to the user. Specifically, according to the display position of a predetermined display element which is displayed while being moved on the input operation surface 115, or according to the touch position of the finger F, the control unit can drive the drive unit 150, thereby moving the panel 110 up or down, whereby it is possible to give a three-dimensional novel feeling to the user.

In other words, in a case where the user performs an input operation with the finger F as shown in FIG. 14A, if the user slides the finger from a predetermined touch position, for example, toward the right, whereby the finger reaches a first position A1, the control unit 20 may drive the drive unit 150, thereby raising the panel 110. If the user keeps sliding the finger F toward the right, whereby the finger reaches, for example, a second position A2, the control unit 20 may drive the drive unit 150, thereby lowering the panel 110.

In this case, since the panel 110 rises while the finger F moves between the first position A1 and the second position A2, the finger can get a feeling as if the finger rises up unlike the other areas. Also, the control unit 20 can appropriately combine control on the drive unit 150 which moves the panel in the vertical direction and control on driving of the vibrating element 120, thereby capable of giving a more novel feeling to the user. Also, in this case, the control unit 20 can change the moving distance of the panel 110, for example, according to the position of the finger F or the display position of a display element. Therefore, even in this case, it is possible to give different feelings depending on the types of input operations by performing such control on the moving distance of the panel, thereby capable of improving operability.

Also, the control unit 20 can change acceleration during movement of the panel 110 by the drive unit 150, that is, acceleration during rising and lowering, as shown in FIG. 14B. In other words, if the control unit performs control such that, while the finger F slides, acceleration of rising of the panel 110 gradually increases and then acceleration of lowering of the panel 110 gradually increases, it is possible to give the user a feeling as if the finger F rides over a hump, for example, in an area "B".

Therefore, even in this case, the control unit 20 can appropriately combine control on the drive unit 150 which moves the panel in the vertical direction and control on driving of the vibrating element 120, thereby capable of giving a more novel feeling to the user. Further, if the squeeze effect which is achieved by driving the vibrating element 120 is used in addition to vertical movement of the panel 110, it is possible to give a more novel feeling.

Fourth Embodiment

Figure 15:
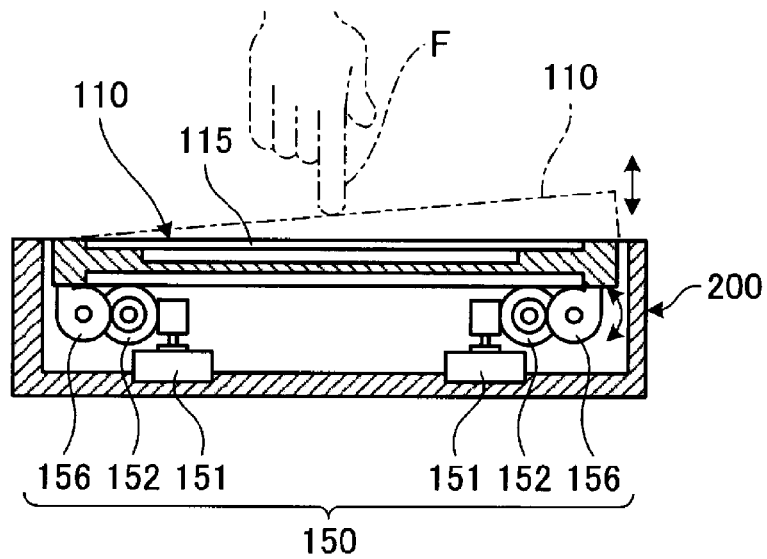
FIG. 15 is an explanatory view schematically illustrating an example of the structure of an input device according to a fourth embodiment.

Now, an input device 10 according to a fourth embodiment will be described with reference to some drawings. FIG. 15 is an explanatory view schematically illustrating an example of the structure of the input device 10 according to the fourth embodiment. In the following description, components identical to those of the first to third embodiments are denoted by the same reference symbols, and will not be described in detail.

The input device 10 according to the fourth embodiment is different from the input device 10 according to the third embodiment in that a drive unit 150 which is a panel supporting unit can independently move each of at least three points of a panel 110 in a direction perpendicular to the input operation surface 115.

In other words, the drive unit 150 according to the present embodiment is configured of three independent drive mechanisms capable of moving at least three points of the panel 110 as shown in FIG. 15. However, in FIG. 15, for convenience, one drive mechanism is not shown.

Each of the three drive mechanisms constituting the drive unit 150 includes a motor 151, a speed reducing mechanism 152 which is composed of a speed reducer and a gear group, and rotates a pinion at low speed if receiving an output of the motor 151, and a rotary member 156 which can rotate in a normal direction and a reverse direction (for example, in a clockwise direction and a counterclockwise direction) if receiving torque from the speed reducing mechanism 152.

The drive mechanisms are installed such that the input operation surface 115 inclines at a desired angle. Alternatively, a plurality of drive mechanisms can be configured such that the arrangement of them is changeable such that the drive mechanisms can support the panel 110 at an arbitrary support angle.

As described above, in the present embodiment, the drive unit 150 which is a panel supporting unit is configured to have three independent drive mechanisms for supporting the panel 110 at at least three points, thereby capable of inclining the panel 110 at an arbitrary angle in any direction. Therefore, it is possible to give the operating finger F different feelings depending on the inclination direction and inclination angle of the input operation surface 115. Further, even in this case, if the squeeze effect which is achieved by driving the vibrating element 120 is used in addition to inclining of the panel 110, it is possible to give a more novel feeling.

Also, the control unit 20 can change the driving state of the drive unit 150 according to the display position of a certain display element which is displayed while being moved on the input operation surface 115, thereby capable of giving various novel feelings to the input operation finger F.

Figure 16:
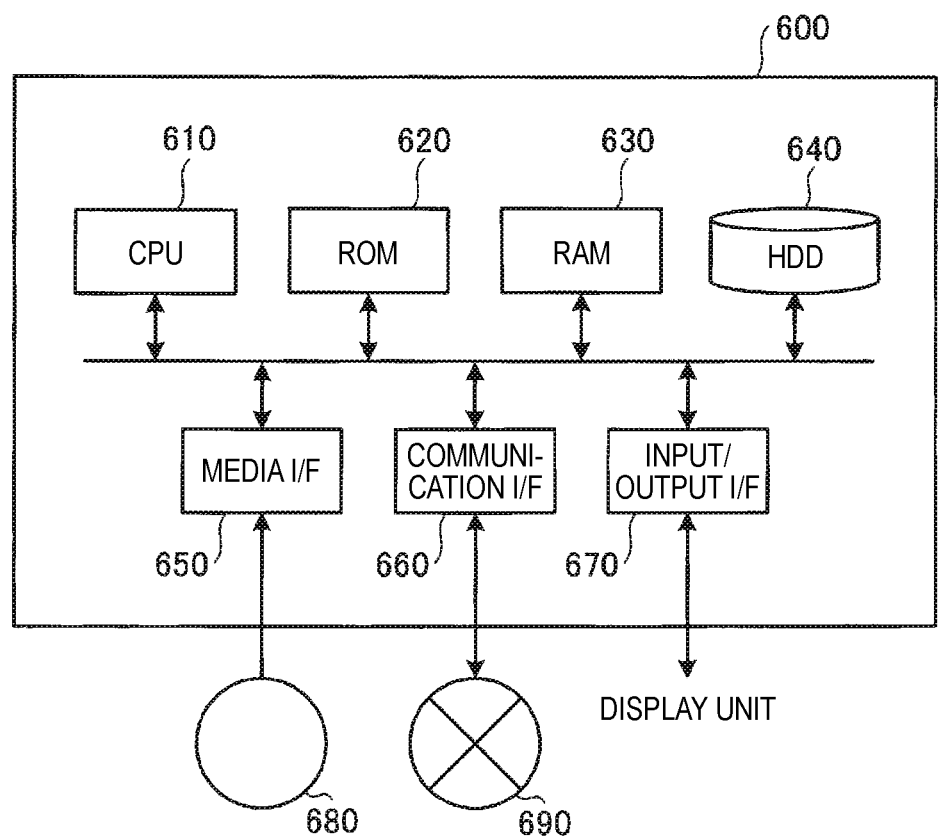
FIG. 16 is a hardware configuration diagram illustrating an example of a computer for implementing the functions of an in-vehicle device according to an embodiment.

Finally, the hardware configuration of an in-vehicle device 1 according to the present embodiment will be described. FIG. 16 is a hardware configuration diagram illustrating an example of a computer for implementing the function of the in-vehicle device 1, and it is possible to implement the in-vehicle device 1 by a computer 600 having the configuration shown as an example in FIG. 16.

The computer 600 includes a central processing unit (CPU) 610, a read only memory (ROM) 620, a random access memory (RAM) 630, and a hard disk drive (HDD) 640. Also, the computer 600 includes a media interface (I/F) 650, a communication interface (I/F) 660, and an input/output interface (I/F) 670.

Also, the computer 600 may include a solid state drive (SSD) for performing all or some of the functions of HDD 640. Also, the computer 600 may have an SSD in place of the HDD 640.

The CPU 610 operates on the basis of programs stored at least one of the ROM 620 and the HDD 640, thereby controlling the individual units. The ROM 620 is for storing a boot program which the CPU 610 executes during activation of the computer 600, programs depending on hardware of the computer 600, and so on. The HDD 640 is for storing programs which the CPU 610 can execute, data which are useable in those programs, and so on.

The media I/F 650 reads a program or data stored in a storage medium 680 such as a magneto-optical recording medium like a digital versatile disc (DVD), an SD card, or a USB memory, and provides the program or data to the CPU 610 through the RAM 630. The CPU 610 loads the corresponding program from the storage medium 680 into the RAM 630 through the media I/F 650, and executes the loaded program. Also, the CPU 610 may use the corresponding data to execute a program.

The computer 600 receives data from another device through a network 690, and transmits the received data to the CPU 610. Also, the computer transmits data generated by the CPU 610, to another device through the network 690. Further, the computer 600 receives programs from other devices through the network 690, and transmits the received programs to the CPU 610, and the CPU 610 executes the corresponding programs.

The CPU 610 controls a display unit such as a liquid crystal display, an output unit such as a speaker, and an input unit such as a keyboard, a mouse, buttons, and an operation unit, through the input/output I/F 670. The CPU 610 acquires data from the input unit through the input/output I/F 670. Also, if the CPU 610 generates data, it outputs the generated data to the display unit and the output unit through the input/output I/F 670.

For example, in a case where the computer 600 functions as the in-vehicle device 1, the CPU 610 of the computer 600 executes programs loaded into the RAM 630, thereby implementing the individual functions of the control unit 20 of the input device 10 including a detecting unit 210, a vibration control unit 220, a display control unit 230, and a drive control unit 240.

For examples, the CPU 610 of the computer 600 reads those programs from the storage medium 680, and executes the read programs. However, as another example, the CPU may acquire those programs from another device through the network 690. Also, information which is stored in the storage unit 30 can be stored in the HDD 640.

According to the embodiments described above, it is possible to implement an input device 10 or an in-vehicle device 1 to be described below.

(1) An input device 10 includes: a panel 110 that has an input operation surface 115; a detecting unit 210 that detects a user's touch operation on the input operation surface 115; a vibrating element 120 which can vibrate the panel 110, thereby capable of changing the frictional force of the input operation surface 115; and a panel supporting unit (300 or 150) that supports the panel 110 such that the panel can move in a direction parallel with or perpendicular to the input operation surface 115.

(2) In the input device 10 according to (1), the panel supporting unit may have an elastic member 300 which resists propulsion in the plane direction of the panel 110 which is caused by friction accompanied by the touch operation.

(3) The input device 10 according to (1) or (2) may include a control unit 20 that changes a feeling during the touch operation, wherein the control unit 20 may change the driving state of the vibrating element 120 on the basis of the detection result of the detecting unit 210, thereby changing the frictional force of the input operation surface 115.

(3-1) In the input device 10 according to (2), physical movement of the panel 110 against the elastic force of the elastic member 300 may be able to turn on or off a switch.

(3-2) In the input device 10 according to (2), movement of the panel 110 against the elastic force of the elastic member 300 may be able to slide a slide type sensor which is displayed on a screen.

(4) In the input device 10 according to (3), the control unit 20 may switch the vibrating element 120 between a driving state and a stop state, according to the display position of a predetermined display element which is displayed while being moved on the basis of the touch operation on the input operation surface 115.

(5) In the input device 10 according to (1), the panel supporting unit may be a drive unit 150 which moves the panel 110 along the input operation surface 115.

(6) In the input device 10 according to (1), the panel supporting unit may be a drive unit 150 which moves the panel 110 in a direction perpendicular to the input operation surface 115.

(7) The input device 10 according to (5) or (6) may include a control unit 20 that changes the feeling during the touch operation, wherein the control unit 20 may change the driving state of the drive unit 150 on the basis of the detection result of the detecting unit 210.

(8) In the input device 10 according to (7), the control unit 20 may change a distance by which the drive unit 150 moves the panel 110, according to the display position of the predetermined display element which is displayed while being moved on the basis of the touch operation on the input operation surface 115.

(9) In the input device 10 according to (7), while the drive unit 150 moves the panel 110, the control unit 20 may change acceleration of the panel according to the display position of the predetermined display element which is displayed while being moved on the basis of the touch operation on the input operation surface 115.

(10) The input device 10 according to any one of (7) to (9), the control unit 20 may change the vibration state of the vibrating element 120 on the basis of the detection result of the detecting unit 210.

(11) The input device 10 according to (1), the panel supporting unit may be a drive unit 150 for independently moving each of at least three points of the panel 110 in a direction perpendicular to the input operation surface 115.

(12) The input device 10 according to (11) may include a control unit 20 that changes a feeling during the touch operation, wherein the control unit 20 may change the driving state of the drive unit 150 on the basis of the determination result of the detecting unit 210.

(13) In the input device 10 according to (12), the control unit 20 may change an angle at which the panel 110 is supported by the drive unit 150, according to the display position of the predetermined display element which is displayed while being moved on the basis of the touch operation on the input operation surface 115.

(14) In the input device 10 according to (12) or (13), the control unit 20 may change the vibration state of the vibrating element 120 on the basis of the detection result of the detecting unit 210.

(15) The input device 10 according to any one of (1) to (14) may include a housing 200 that holds the panel 110 with the panel supporting unit interposed therebetween.

(16) In the input device 10 according to any one of (1) to (15), the panel 110 may be a touch panel having an image display unit.

(17) An in-vehicle device 1 includes the input device 10 of any one of (1) to (16), and a display control unit 230 that performs image display control according to an input operation received by a user's touch operation on the input operation surface 115.

Although the number of vibrating elements 120 which are arranged has not been particularly mentioned in the embodiments, it is sufficient to provide at least one vibrating element 120. However, it is preferable to arrange as many vibrating elements as it is possible to uniformly vibrate the whole of the input operation surface 115. Also, in a case of installing a plurality of vibrating elements 120, if the vibrating elements 120 have different frequencies, it is possible to more finely set variation in a feeling.

Also, in the embodiments described above, the input device 10 is a touch panel having a function of displaying images and the like. However, the present invention is not limited thereto. For example, the input device 10 may be a device which receives inputs according to user's touch operations, like a touch pad.

Also, in a case of using a touch pad as the input device 10 in the in-vehicle device 1, in addition to the touch pad, it is possible to provide a function of displaying images to front glass, or to provide a display unit such that an occupant looking forward can see the display unit without shifting the eyes too much. According to this configuration, even a driver can surely perform an input operation on the basis of variation in a feeling by only a touch operation on the touch pad without turning the eyes from the front.

Also, although the case of using the input device 10 in the in-vehicle device 1 constituting a navigation system for a vehicle has been described, the present invention is not limited thereto. The input device 10 can be applied to other devices such as a smart phone, a tablet terminal, or a personal computer.

Also, for example, it is possible to make the input operation surface 115 of the input device 10 of a compressible material, and change the frictional force of the input operation surface 115 depending on whether the user presses the operation finger F against the input operation surface. Further, in the case of the input device 10 having the drive unit 150, it is possible to give various feelings to the user by changing the driving state depending on whether the user presses the finger F against the input operation surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An input device comprising:
a panel that has an input operation surface;
a panel support driving mechanism that supports the panel such that the panel can move in a direction parallel with or perpendicular to the input operation surface, having an elastic member which resists propulsion in the plane direction of the panel, the propulsion caused by friction based on a user's touch operation;
at least one processor;
a vibrating element that can vibrate the panel, thereby capable of changing the frictional force of the input operation surface; and
a memory storing a program causing the processor to execute the program, the program including steps of:
  detecting the user's touch operation on the input operation surface;
  changing a driving state of the vibrating element on the basis of the detection result of the detecting, thereby changing the frictional force of the input operation surface, and
  switching the vibrating element between the driving state and a stop state according to a display position of a predetermined display element which is displayed,
wherein the panel support driving mechanism is a drive unit which moves the panel along the input operation surface or in a direction perpendicular to the input operation surface, and
wherein the program further includes changing a support angle of the panel by the panel support driving mechanism, according to the display position of a predetermined display element which is displayed while being moved on the basis of a touch operation on the input operation surface.

2. The input device according to claim 1, wherein the panel support driving mechanism is a drive unit which independently moves each of at least three points of the panel in a direction perpendicular to the input operation surface.

3. The input device according to claim 2, wherein the program further includes changing a feeling during the touch operation, and changing the driving state of the panel support driving mechanism on the basis of the detection result of the detecting.

* * * * *